US011679413B2

(12) United States Patent
Vogler

(10) Patent No.: US 11,679,413 B2
(45) Date of Patent: *Jun. 20, 2023

(54) ULTRASONIC VIBRATION SYSTEM HAVING A LATERAL SURFACE MOUNTING

(71) Applicant: Herrmann Ultraschalltechnik GmbH & Co. KG, Karlsbad (DE)

(72) Inventor: Ulrich Vogler, Uhldingen-Muhlhofen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 1154 days.

This patent is subject to a terminal disclaimer.

(21) Appl. No.: 16/325,846

(22) PCT Filed: Aug. 29, 2017

(86) PCT No.: PCT/EP2017/071614
§ 371 (c)(1),
(2) Date: Feb. 15, 2019

(87) PCT Pub. No.: WO2018/041808
PCT Pub. Date: Mar. 8, 2018

(65) Prior Publication Data
US 2019/0210066 A1 Jul. 11, 2019

(30) Foreign Application Priority Data
Sep. 2, 2016 (DE) .................... 10 2016 116 429.1

(51) Int. Cl.
*B29C 65/08* (2006.01)
*B06B 1/06* (2006.01)
(Continued)

(52) U.S. Cl.
CPC .............. *B06B 1/0644* (2013.01); *B06B 1/06* (2013.01); *B06B 3/02* (2013.01); *B23K 20/106* (2013.01);
(Continued)

(58) Field of Classification Search
CPC ..... B06B 1/0644; B06B 3/02; B06B 2201/72; B23K 20/106; B29C 65/06; B29C 65/08; B29C 65/081
(Continued)

(56) References Cited

U.S. PATENT DOCUMENTS 3,939,033 A   2/1976   Grgach
5,603,444 A   2/1997   Sato
(Continued)

FOREIGN PATENT DOCUMENTS

CN   1149520 A   5/1997
CN   1294558 A   5/2001
(Continued)

OTHER PUBLICATIONS

Office Action, dated Nov. 9, 2021, Japanese Patent Application No. 2019-510710 (and English translation of Office Action.
(Continued)

*Primary Examiner* — James D Sells
(74) *Attorney, Agent, or Firm* — Paul & Paul

(57) ABSTRACT

The present invention concerns an ultrasonic vibration system comprising a sonotrode which has two sonotrode end faces and a circumferentially extending lateral surface connecting the two sonotrode end faces together, wherein the sonotrode has an elongate core element and at least one wing element, wherein core element and wing element respectively extend from the one sonotrode end face to the other sonotrode end face in a longitudinal direction, wherein the wing element has a sealing surface which is provided to
(Continued)

come into contact with a material for processing thereof and is connected to the core element by way of a plurality of webs spaced from each other in the longitudinal direction of the core element, and a converter which is optionally connected to the sonotrode by way of an amplitude transformer. According to the invention it is proposed that the ultrasonic vibration system is connected to a machine stand by way of a mounting connected to the lateral surface.

19 Claims, 5 Drawing Sheets

(51) Int. Cl.
    *B23K 20/10*     (2006.01)
    *B29C 65/06*     (2006.01)
    *B06B 3/02*     (2006.01)
    *B06B 3/00*     (2006.01)

(52) U.S. Cl.
    CPC .............. *B29C 65/06* (2013.01); *B29C 65/08* (2013.01); *B29C 65/081* (2013.01); *B06B 3/00* (2013.01); *B06B 2201/40* (2013.01); *B06B 2201/72* (2013.01)

(58) Field of Classification Search
    USPC ...................................................... 156/580.1
    See application file for complete search history.

(56) References Cited

U.S. PATENT DOCUMENTS

| | | |
|---|---|---|
| 6,605,178 B1 | 8/2003 | Shinohara et al. |
| 9,862,513 B2 | 1/2018 | Hull |
| 11,090,759 B2* | 8/2021 | Vogler .................. B06B 1/0207 |
| 2006/0193914 A1 | 8/2006 | Ashworth et al. |
| 2008/0237299 A1 | 10/2008 | Vogler et al. |
| 2012/0012258 A1 | 1/2012 | Vogler |
| 2013/0213580 A1 | 8/2013 | Thaerigen |
| 2015/0210003 A1 | 7/2015 | Short et al. |
| 2016/0023297 A1 | 1/2016 | Stroh et al. |
| 2016/0052658 A1 | 2/2016 | Solenthaler |

FOREIGN PATENT DOCUMENTS

| | | |
|---|---|---|
| CN | 101340985 A | 1/2009 |
| CN | 102421585 A | 4/2012 |
| CN | 105026095 A | 11/2015 |
| CN | 105163926 A | 12/2015 |
| EP | 1740156 B1 | 7/2011 |
| EP | 2353737 A1 | 8/2011 |
| EP | 2743060 A1 | 6/2014 |
| JP | S5799377 A | 6/1982 |
| JP | 2007533692 A | 11/2007 |
| JP | 4147309 B2 | 7/2008 |
| JP | 2008528654 A | 7/2008 |
| JP | 2013544625 A | 12/2013 |
| JP | 2014117752 A | 6/2014 |
| JP | 5926439 B1 | 5/2016 |

OTHER PUBLICATIONS

Nora Lindner, International Preliminary Report on Patentability, PCT/EP2017/071614, World Intellectual Property Organization, dated Mar. 7, 2019, English Translation.
Office Action, dated May 19, 2020, Japanese Patent Application No. 2019-510709 (with English translation).
Japan Patent Office, Office Action, dated Feb. 16, 2021, Co-Pending Application No. JP 2019-510710, Patent Examination Department II, Motor Control, Tetsuya Misawa (English Translation Provided).
China National Intellectual Property Administration, Office Action, dated Apr. 28, 2020, Chinese Application No. 201780052151.3 (with English Translation).
European Patent Office, Rule 71(3) Communication, dated Jan. 24, 2022, European Patent Application EP 17758541.1.

* cited by examiner

ULTRASONIC VIBRATION SYSTEM HAVING A LATERAL SURFACE MOUNTING

CROSS-REFERENCE TO RELATED APPLICATION

This application is a 371 national stage application of International Application PCT/EP2017/071614, filed Aug. 29, 2017, and claims the priority of German Application No. 10 2016 116 429.1, filed on Sep. 2, 2016.

The present invention concerns an ultrasonic vibration system comprising a sonotrode which has two sonotrode end faces and a circumferentially extending lateral surface connecting the two sonotrode end faces together, wherein the sonotrode has an elongate core element and at least one wing element, wherein core element and wing element respectively extend from the one sonotrode end face to the other sonotrode end face, wherein the wing element has a sealing surface which is provided to come into contact with a material for processing thereof and is connected to the core element by way of a plurality of webs spaced from each other in the longitudinal direction of the core element.

Such an ultrasonic vibration system is known from EP 2 353 737 B1.

A particularity of that kind of sonotrode is that the elongate sealing surface performs a vibration in a plane (in-plane vibration), which is advantageous for certain situations of use.

Most other known sonotrodes are designed in such a way that they can be excited with a longitudinal vibration so that a standing wave is produced in the direction of the longitudinal axis thereof. The sealing surface is then at a vibration maximum and affords a longitudinal vibration in the direction of the material to be processed. Basically the sonotrode moves at an ultrasonic frequency in the direction of the material to be processed and back again and thus 'hammers' on the material.

In contrast thereto in the sonotrode set forth in the opening part of this specification an in-plane vibration is impressed on the sealing surface so that the sealing surface moves to and fro on the material to be processed and friction welding takes place.

The idea on which EP 2 353 737 B1 is based is to excite the sonotrode with a kind of flexural vibration so that the core element and the wing element move in opposite relationship. In that case the core element is excited and by virtue of the connection of the wing elements by way of the plurality of webs, that results in opposite movement of the sealing surface mounted on the wing element.

In EP 2 353 737 B1 the core element is excited by a converter arranged symmetrically relative to the longitudinal centre line of the core element. In addition the sonotrode is held by the converter. The sonotrode does not have a separate mounting so that all welding forces have to be carried by way of the converter.

As can already be seen from the Figures of EP 2 353 737 B1 the edge regions in particular of the sealing surfaces however exhibit additional vibration components perpendicular to the sealing surface, Basically the sealing surface in the excited state presents a 'wavy' structure. Mounting the sonotrode by way of the converter on the end faces also leads to bending distortion of the sonotrode when a welding force is applied therewith to the material to be processed. That bending distortion in turn has the result that the sealing surface does not apply a uniform sealing force to the material. That however is essential for achieving a homogeneous welding result, in particular in the case of the in-plane vibration used here. That sonotrode can therefore only be used for applications in which the necessary welding force is not excessively great.

In addition user-specific structural space demands are frequently made, which cannot be met with the excitation and mounting element shown in EP 2 353 737 B1, as the sonotrode which is in any case already very long is made still larger in the longitudinal direction by the converter.

U.S. Pat. No. 3,939,033, EP 2 743 060 A1 and U.S. Pat. No. 6,605,178 B1 show sonotrodes which can be induced by a longitudinal vibration, such that a standing wave is formed in the direction of the longitudinal axis. Here, the sealing surface is at a vibration maximum and performs a longitudinal vibration in the direction of the material to be processed.

Therefore the object of the present invention is to avoid or at least attenuate the above-mentioned disadvantages.

According to the invention that object is attained in that the ultrasonic vibration system is connected to a machine stand by way of a mounting connected to the lateral surface.

According to the invention that object is attained in that the by an ultrasonic vibration system according to claim 1.

In contrast to EP 2 353 737 B1 mounting is now no longer implemented by way of a converter arranged symmetrically relative to the longitudinal centre line of the core element, but by way of a mounting which engages the lateral surface of the sonotrode.

Because the mounting engages the lateral surface welding forces which occur can be better carried. Thus it is possible for example for the mounting and the converter or the amplitude transformer to be implemented separately from each other and therefore engage the sonotrode at mutually spaced regions. The application of a welding force therefore no longer results in bending distortion or tipping of the sonotrode so that the excitation vibration remains unaffected.

It is provided that the mounting has a material-bonded joint comprising a first joint member and a second joint member which are connected together by way of a flexible element. The design of the mounting in the form of a material-bonded joint results in decoupling of the machine stand from the sonotrode in order to reduce the influence on the ultrasonic vibration system by the mounting on the machine stand. Nonetheless the vibration system can be reliably mounted in place.

In conformity with the 'IFToMM permanent commission for the standardization of terminology' the term a material-bonded joint is used to denote a joint in which two adjacent members, specifically the first and the second joint members, are connected together in material-bonded relationship and their relative mobility is made possible by the flexibility of the connection, namely the flexible element. Material-bonded joints are also referred to as rigid-body joints, solid-state flexural joints or spring joints. The first and second joint members as well as the connection between the joint members are therefore made in one piece. In that case the connection has a certain degree of flexibility which allows deformation and thus a relative movement between the first and second joint members.

Such a material-bonded joint is simple and inexpensive to manufacture. The joint affords a return force which ensures that the ultrasonic vibration unit remains substantially at its intended position, in which respect an in-plane vibration of the wing element is to be damped as little as possible at the same time.

In a preferred embodiment of the invention the sonotrode has two wing elements which are respectively connected to the core element by way of a plurality of webs spaced from each other in the longitudinal direction of the core element, wherein preferably the two wing elements and the core element are disposed in one plane.

In this embodiment the sonotrode can be of a symmetrical configuration relative to the longitudinal axis of the core element.

In that case for example one of the wing elements can be the first joint member which is connected to the machine stand by way of a flexible element while the other wing element has the sealing surface which is intended to come into contact with a material for processing thereof.

Therefore in a preferred embodiment it is provided that the flexible element is fixed to one of the wing elements. It has been shown in particular that the flexible element engages in a region of the wing element, that is within a notional prolongation of one of the webs in the direction of the wing element.

In addition it is advantageous if the flexible element is of a length of between 8 and 25 mm and best between 10 and 15 mm.

In order to prevent transmission of the vibration to the machine stand by way of the flexible element it is advantageous if the flexible element is of a length less than the length of the webs. It has been found that the flexible element at best is of a length which is between 60 and 90% of the web length.

It is also advantageous if the width $b_{Flex}$ of the flexible elements in the direction of the length L is less than the width $b_S$ of the webs; it has been found that the flexible elements at best are of a width $b_{Flex}$ which is between 5 and 90% of the web width $b_S$, preferably between 20 and 60%.

In a further preferred embodiment it is provided that the ultrasound vibration unit is connected to a machine stand by way of at least two and preferably three material-bonded joints connected to the lateral surface.

In that arrangement it is advantageous for all material-bonded joints to engage one and the same wing element.

In a further preferred embodiment there is provided a converter which is optionally connected to the sonotrode by way of an amplitude transformer, more specifically preferably to the lateral surface of the sonotrode.

Because the amplitude transformer or converter no longer engages the end face of the sonotrode but the lateral surface the overall length of the ultrasonic vibration system can be further reduced.

Particularly when the converter is connected to the sonotrode in a region which is closer to the one sonotrode end face than the other sonotrode end face it can be arranged beside the sonotrode without the overall length of the sonotrode being increased.

In a preferred embodiment the webs are formed between through openings in the lateral surface, wherein preferably the through openings are elongate and the longitudinal direction thereof extends from the core element to the wing element. In that case the wing element is preferably of a thickness less than the thickness of the core element, wherein preferably the thickness of the wing element is less than 75% of the thickness of the core element. In addition the wing element is of a width less than the width of the core element, wherein preferably the width of the wing element is less than 30% of the width of the core element. It has been found that the movement of the sealing surface of the wing element can be increased thereby.

Further advantages, features and possible uses of the present invention will be apparent from the description hereinafter of two embodiments of the invention and the accompanying Figures in which:

FIG. 1 shows a first embodiment of an ultrasonic vibration system 1. FIG. 2 shows a perspective view of that embodiment while FIG. 3 shows a side view.

The ultrasonic vibration system 1 comprises a sonotrode which in turn has a core element 2 and two wing elements 3, 4. The wing elements 3, 4 are connected to the core element 2 by way of suitable webs 5, 6. Both the core element 2 and also the wing elements 3, 4 extend in the longitudinal direction L. The sonotrode has a series of through openings which are so arranged that the webs 5, 6 are formed between the openings.

Figure 1:
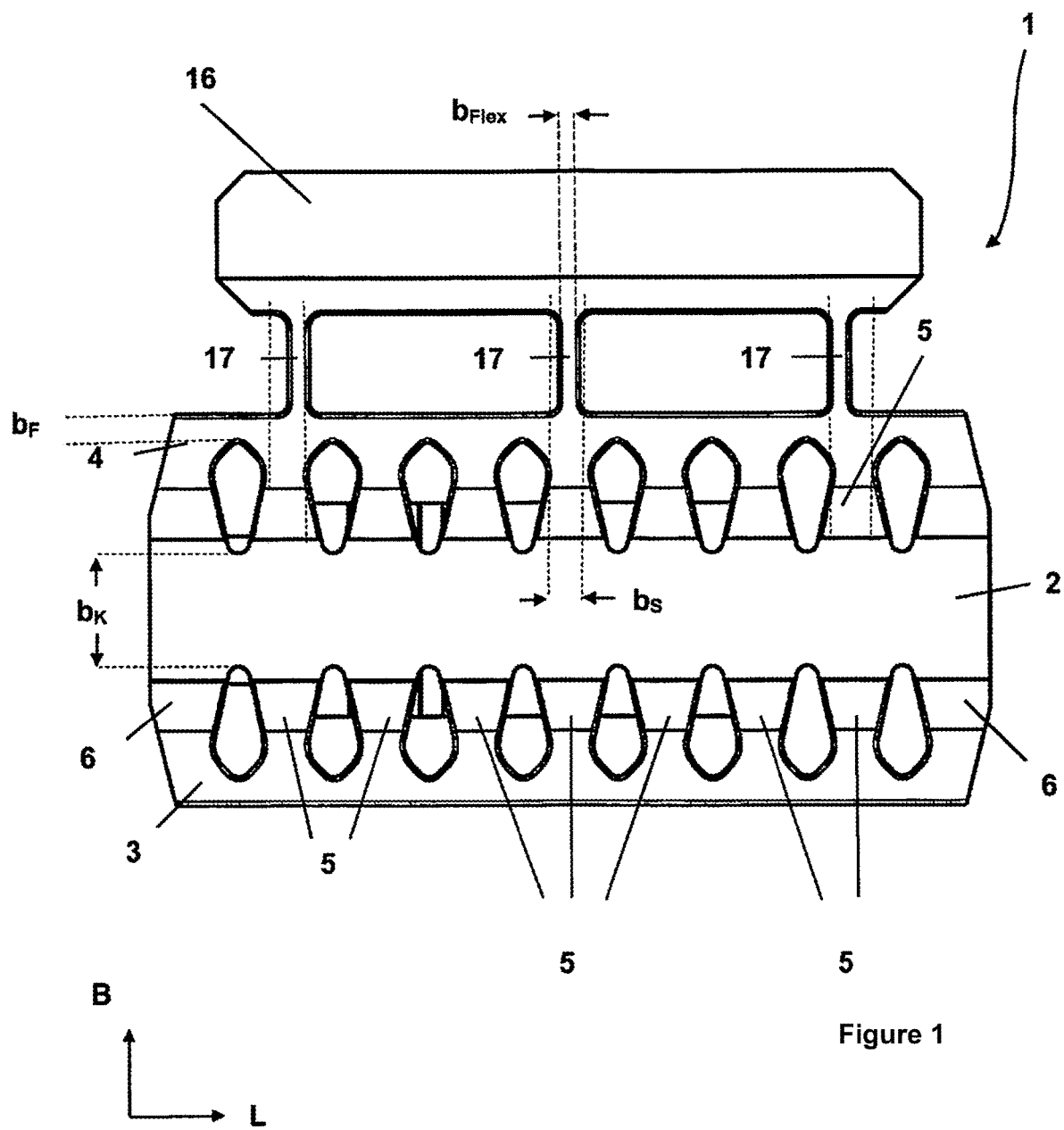
FIG. 1 shows a plan view of a first embodiment of an ultrasonic vibration unit according to the invention.
Figure 2:
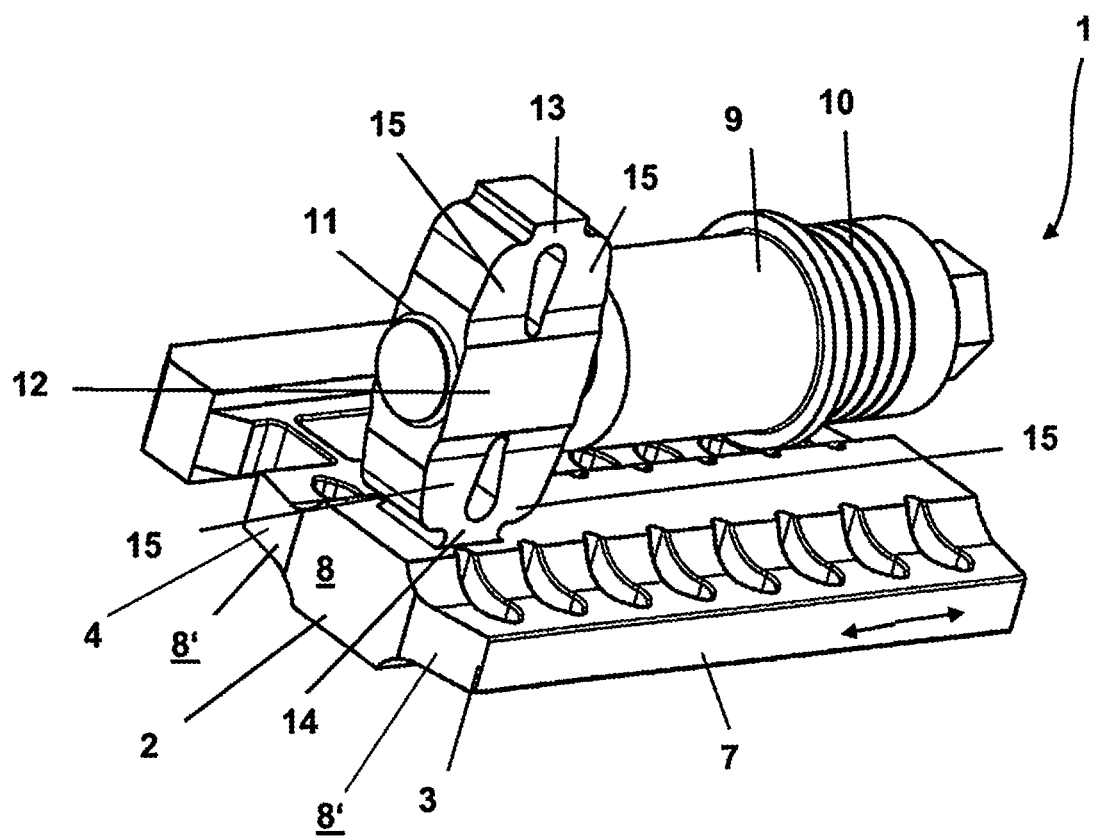
FIG. 2 shows a perspective view of the embodiment of FIG. 2.
Figure 3:
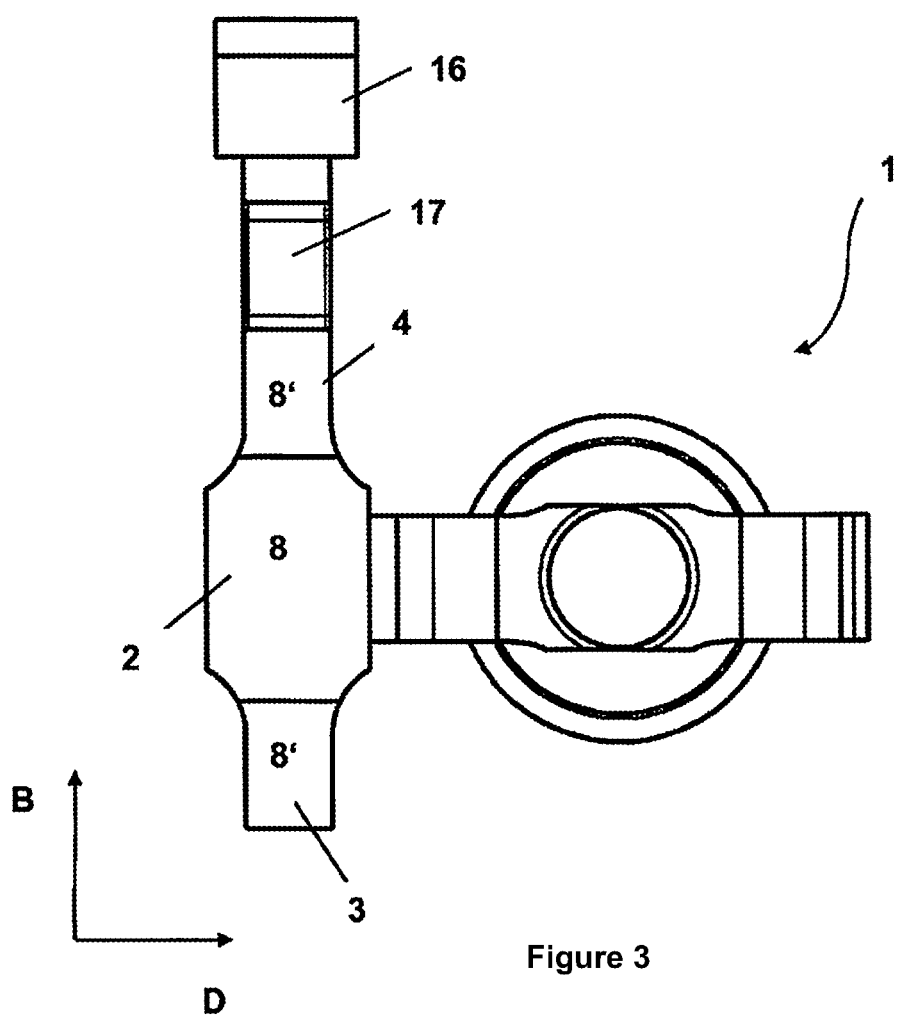
FIG. 3 shows a side view of the embodiment of FIG. 1.

It will be seen from FIG. 2 that the core element 2 is of a greater thickness (in the direction D) than the two wing elements 3, 4. Likewise the core element 2 is of a width $b_K$ (in the direction B) greater than the width $b_F$ of the wing elements. The core element 2 is of an elongate configuration and together with the wing elements 3, 4 and the connecting webs 5, 6 has two end faces which are connected together by way of a circumferentially extending lateral surface. The lateral surface can be clearly seen in FIG. 1 while FIG. 3 shows a view on to one of the two end faces 8, 8'. The end face 8, 8' of the sonotrode has two bevel surfaces 8.

A wing element 3 has a sealing surface 7 which is intended to come into contact with the material to be processed. In operation that sealing surface is intended to perform an in-plane vibration which is as homogeneous as possible and the direction of which is diagrammatically shown in FIG. 2 by means of a double-headed arrow.

To permit such in-plane vibration of the sealing surface 7 the ultrasonic vibration unit 1 has to be excited. In the illustrated embodiment the core element is caused to perform an ultrasonic vibration which is transmitted by means of the webs 5, 6 to the wing elements and in particular to the sealing surface 7. A converter 9 having suitable piezoelectric elements 10 is used for excitation purposes, the elements 10 converting an electric ac voltage into a longitudinal mechanical ultrasonic vibration. That is transmitted to the amplitude transformer 11 which here is of a similar structure to the sonotrode, more specifically comprising an amplitude transformer core element 12, amplitude transformer wing elements 13, 14 and connecting webs 15 which connect the amplitude transformer core element 12 to the amplitude transformer wing elements 13, 14.

By virtue of the converter 9 being coupled to the amplitude transformer 11 the amplitude transformer core element 12 is caused to perform an in-plane vibration which is transmitted by way of the connecting webs 15 to the amplitude transformer wing elements 13, 14. As the amplitude transformer wing element 14 is connected to the core element 2 of the sonotrode the vibration is transmitted to the sonotrode and thus to the sealing surface 7. As a result this gives a very compact structure for an ultrasonic vibration unit 1.

In order to influence the vibration amplitude as little as possible a mounting is provided at the side of the sonotrode that is remote from the sealing surface 7, that is to say at the wing element 4, the mounting being formed from a fixing beam 16 which can be fixedly connected to a machine stand. and corresponding flexible elements 17. Bores for fixing the fixing beam 16 to the machine stand can be arranged in the fixing beam 16. In that case the wing element 4, the flexible elements 17 and the fixing beam 16 form rigid-body joints. The flexible elements 17 are of a length of about 14 mm in the direction B. The flexible elements 17 are formed by elements in blade form, which are of a markedly smaller dimension in the longitudinal direction L than in the two directions B and D perpendicular thereto. The result of this is that the flexible elements are of a much greater flexibility in the longitudinal direction L than in the directions perpendicular thereto. That measure permits reliable mounting of the sonotrode even when a welding force is being applied to the sealing surface while at the same time the in-plane vibration of the wing element 4 is only slightly influenced by virtue of the flexible elements.

It can be seen from FIG. 1 that all flexible elements 17 engage the wing element at least in part in the region of a projection of the webs on to the wing element 4. The projections are shown as a broken line in FIG. 1. The flexible elements are therefore not arranged 'above' the through openings but 'above' the webs.

In the illustrated example the wing element 3 is connected to the core element 2 by way of a total of nine webs 5, 6. It will be seen that the end faces respectively have a bevel surface at both sides in the direction of the wing elements whereby the width of the outer webs 6 is reduced. By virtue of that measure the vibration performance of the sonotrode can be improved.

In addition the width $b_{Flex}$ of the flexible elements in the direction of the length L is less than the width $b_S$ of the webs. The term width $b_S$, in the case of a width which is not constant, is used to denote the minimum width, as shown in FIG. 1. Likewise the term width $b_{Flex}$ is used for the case of a width of the flexible element that is not constant, to denote the minimum width of the flexible element.

Figure 4:
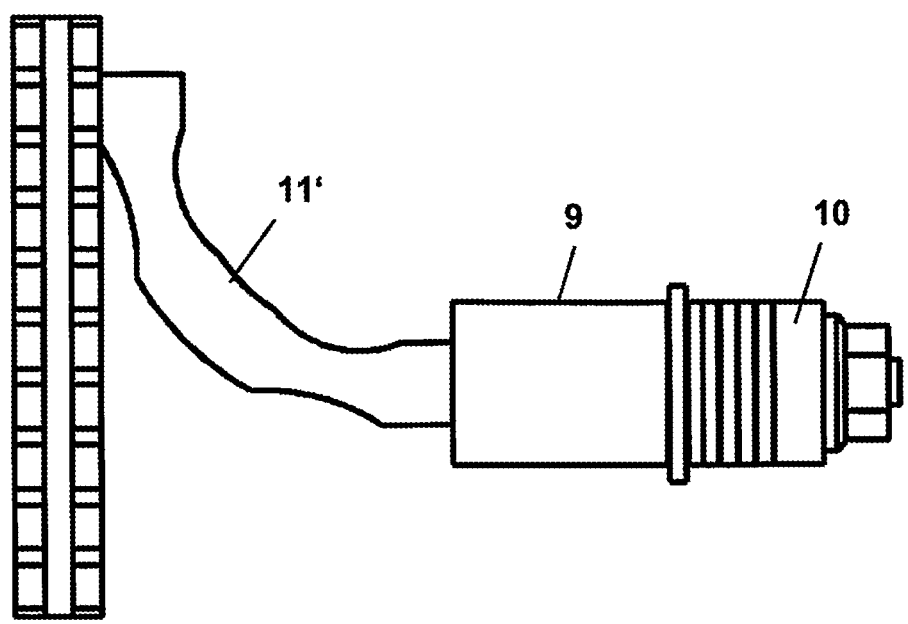
FIG. 4 shows a plan view of a second embodiment of the invention.
Figure 5:
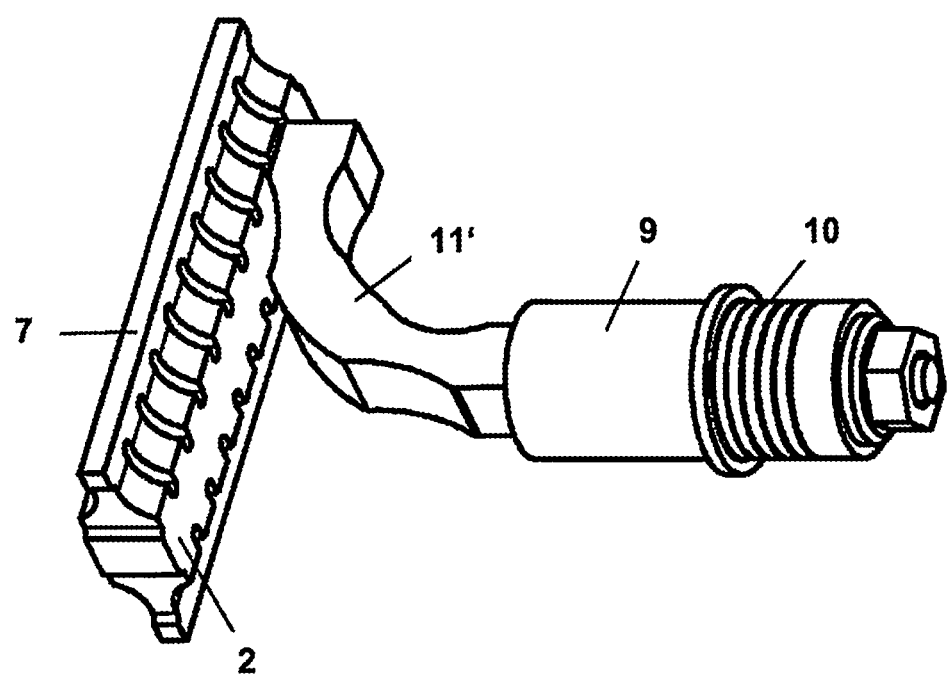
FIG. 5 shows a perspective view of the embodiment of FIG. 4.

FIGS. 4 and 5 show a second embodiment of the invention. In this case the sonotrode is constructed in the same manner as the embodiment shown in FIGS. 1 to 3. The sole difference here is that another amplitude transformer is used. This substantially comprises a curved element 11' which converts the longitudinal ultrasonic vibration generated by the converter 9 by means of the piezoelectric discs 10 into an in-plane vibration. The curved amplitude transformer 11' is then again connected to the core element 2 of the sonotrode.

The mounting can be as in the embodiment shown in FIGS. 1 to 3. The mounting however is not illustrated in FIGS. 4 and 5.

LIST OF REFERENCES 1 ultrasonic vibration system/ultrasonic vibration unit
2 core element
3 wing element
4 wing element
5 web
6 web
7 sealing surface
8, 8' end face
9 converter
10 piezoelectric element
11 amplitude transformer
11' curved element
12 amplitude transformer core element
13 amplitude transformer wing element
14 amplitude transformer wing element
15 connecting webs
16 fixing beam
17 flexible elements

The invention claimed is:

1. An ultrasonic vibration system comprising a sonotrode which has two sonotrode end faces (8, 8') and a circumferentially extending lateral surface connecting the two sonotrode end faces (8, 8') together, wherein the sonotrode has an elongate core element (2) and at least one wing element (3, 4), wherein core element (2) and wing element (3, 4) respectively extend from the one sonotrode end face (8, 8') to the other sonotrode end face (8, 8') in a longitudinal direction, wherein the wing element (3) has a sealing surface (7) which is provided to come into contact with a material for processing thereof and is connected to the core element (2) by way of a plurality of webs (5, 6) spaced from each other in the longitudinal direction, and a converter which is optionally connected to the sonotrode by way of an amplitude transformer (11), wherein the ultrasonic vibration system is connected to a machine stand by way of a mounting connected to the lateral surface, characterised in that the mounting has a material-bonded joint comprising a first joint member and a second joint member which are connected together by way of a flexible element (17).

2. An ultrasonic vibration system according to claim 1 characterised in that the sonotrode has two wing elements (3, 4) which are respectively connected to the core element (2) by way of a plurality of webs (5, 6) spaced from each other in the longitudinal direction of the core element (2).

3. An ultrasonic vibration system according to claim 2 characterised in that the one of the wing elements (4) is the first joint member.

4. An ultrasonic vibration system according to claim 3 characterised in that the flexible element (17) is fixed to the first joint member (4).

5. An ultrasonic vibration system according to claim 4 characterised in that the flexible element (17) engages in a region of the first joint member (4), which lies within a notional prolongation of one of the webs (5, 6) in the direction of the first joint member (4).

6. An ultrasonic vibration system according to claim 1 characterised in that the flexible element (17) is of a length of between 8 and 25 mm.

7. An ultrasonic vibration system according to claim 1 characterised in that the width $b_{Flex}$ of the flexible elements (17) in the direction of the length L is less than the width $b_S$ of the webs.

8. An ultrasonic vibration system according to claim 1 characterised in that the ultrasound vibration unit is connected to a machine stand by way of at least two material-bonded joints connected to the lateral surface.

9. An ultrasonic vibration system according to claim 1 characterised in that there is provided a converter which is connected to the lateral surface of the sonotrode by way of the amplitude transformer.

10. An ultrasonic vibration system according to claim 1 characterised in that the webs (5, 6) are formed between through openings in the lateral surface, wherein the through openings are elongate and the longitudinal direction thereof extends from the core element (2) to the wing element (3, 4).

11. An ultrasonic vibration system according to claim 1 characterised in that the wing element (3, 4) is of a thickness less than the thickness of the core element (2).

12. An ultrasonic vibration system according to claim 1 characterised in that the wing element (3, 4) is of a width less than the width of the core element (2).

13. An ultrasonic vibration system according to claim 2 wherein the two wing elements (3, 4) and the core element (2) are disposed in one plane.

14. An ultrasonic vibration system according to claim 6 characterised in that the flexible element (17) is of a length of between 10 and 15 mm.

15. An ultrasonic vibration system according to claim 7 wherein the flexible elements are of a width $b_{Flex}$ which is between 5 and 90% of the web width $b_S$.

16. An ultrasonic vibration system according to claim 15 wherein the flexible elements are of a width $b_{Flex}$ which is between 20 and 60% of the web width $b_S$.

17. An ultrasonic vibration system according to claim 8 characterised in that the ultrasound vibration unit is connected to a machine stand by way of three material-bonded joints connected to the lateral surface.

18. An ultrasonic vibration system according to claim 11, wherein the thickness of the wing element is less than 75% of the thickness of the core element.

19. An ultrasonic vibration system according to claim 12 wherein the width of the wing element is less than 50% of the width of the core element.

\* \* \* \* \*